US005677381A

United States Patent [19]

Peiffer et al.

[11] Patent Number: 5,677,381
[45] Date of Patent: Oct. 14, 1997

[54] ETHYLENE COPOLYMER-MONOFUNCTIONAL IONOMER COMPOSITIONS

[75] Inventors: Dennis George Peiffer, Annandale; James Joseph Chludzinski, Whitehouse Station, both of N.J.; Ching-Tai Lue, Houston; Thomas Craig Erderly, Baytown, both of Tex.

[73] Assignee: Exxon Research and Engineering Company, Florham Park, N.J.

[21] Appl. No.: 499,262

[22] Filed: Jul. 7, 1995

[51] Int. Cl.[6] ............................ C08L 23/08; C08L 23/32
[52] U.S. Cl. ........................ 525/195; 525/196; 525/240; 525/333.9
[58] Field of Search .......................... 525/240, 195, 525/196, 333.9

[56] References Cited

U.S. PATENT DOCUMENTS

| | | | |
|---|---|---|---|
| 3,642,728 | 2/1972 | Canter | 260/79.3 |
| 3,974,241 | 8/1976 | Lundberg et al. | 525/333.9 |
| 4,105,647 | 8/1978 | O'Farrell et al. | 525/333.9 |
| 4,142,040 | 2/1979 | Albee, Jr. et al. | 525/183 |
| 4,668,834 | 5/1987 | Rim et al. | 526/160 |
| 5,030,695 | 7/1991 | Cozewith et al. | 525/333.9 |
| 5,229,478 | 7/1993 | Floyd et al. | 526/160 |
| 5,382,630 | 1/1995 | Stehling et al. | 525/240 |
| 5,389,271 | 2/1995 | Lundberg et al. | 252/33 |
| 5,391,629 | 2/1995 | Turner et al. | 525/268 |

FOREIGN PATENT DOCUMENTS

| | | | |
|---|---|---|---|
| 0082709 | 6/1983 | European Pat. Off. | C08F 8/36 |
| 93/13143 | 7/1993 | WIPO | C08F 10/02 |
| 95/11264 | 4/1995 | WIPO | C08F 10/02 |
| 95/30713 | 11/1995 | WIPO | C08L 23/06 |

*Primary Examiner*—D. R. Wilson
*Attorney, Agent, or Firm*—Joseph J. Dvorak; Jay Simon

[57] ABSTRACT

In one embodiment of the present invention, there is provided a composition comprising a major amount of an ethylene alpha olefin copolymer and a minor amount of a lower molecular weight ethylene alpha olefin or a neutralized sulfonated ethylene alpha olefin.

5 Claims, No Drawings

ETHYLENE COPOLYMER-MONOFUNCTIONAL IONOMER COMPOSITIONS

FIELD OF THE INVENTION

The present invention relates to ethylene alpha olefin copolymer compositions. More particularly, the present invention is concerned with enhancing the processability of ethylene alpha olefin and copolymers prepared using single-site catalysts.

BACKGROUND OF THE INVENTION

In recent years, a new class of polyolefin and polyolefin copolymers has been developed based on use of the so-called single site catalysts. These catalysts, which are organo-metallic coordination compounds of cyclopentadienyl derivatives of Group IVB metals of the Periodic Table of the Elements (56th Ed. of the Handbook of Chemistry and Physics, CRC Press (1975)), produce polyolefins that possess a more narrow molecular weight distribution than can be achieved with conventional Ziegler-Natta type catalysts. This narrow molecular weight distribution results in polymer materials that have better physical properties than that achieved with typical Ziegler-Natta type catalysts. Nonetheless, because of the narrow molecular weight distribution of these materials, they tend to be more difficult to process. Consequently, there is a need to provide a method for enhancing the processability of ethylene alpha olefin copolymers prepared with single site catalysts.

SUMMARY OF THE INVENTION

The present invention is based on the discovery that ethylene alpha olefin copolymers having weight average molecular weights greater than about 30,000 that are prepared in the presence of a single site catalyst have their properties and processability enhanced by including in the copolymer an effective amount of a lower molecular weight ethylene alpha olefin or a neutralized sulfonated ethylene alpha olefin.

Thus, in one embodiment of the present invention there is provided a composition comprising a major amount of an ethylene alpha olefin copolymer and a minor amount of a lower molecular weight ethylene alpha olefin or a neutralized sulfonated ethylene alpha olefin.

These and other embodiments of the present invention will become apparent upon reading of the Detail Description of the Invention which follows.

DETAILED DESCRIPTION OF THE INVENTION

The polymers constituting the major portion of the compositons of the present invention include ethylene alpha olefin copolymers having from about 3 to 12 carbon atoms in the alpha olefin have been prepared using single site catalysts, especially those catalysts described in U.S. Pat. No. 5,391,629, U.S. Pat. No. 4,668,834 and in European Patent Publications 128,046 and 129,368 all of which are incorporated herein by reference. Typically, the copolymers useful in the present invention will have weight average molecular weights of between about 30,000 to about 1 million and preferably between about 30,000 to about 300,000.

The compositions of the present invention will also include a minor amount of a lower molecular weight ethylene alpha olefin or a neutralized sulfonated ethylene alpha olefin copolymer, that is, one having a weight average molecular weight of between about 600 to 50,000 and most preferably between 800 to 20,000 and from 3 to 12 carbon atoms in the alpha olefin. The ethylene alpha olefin copolymers are prepared using a single site catalyst as described in the aforementioned U.S. Patents and European Patent Publications. The preparation of the neutralized sulfonated polymers is disclosed in U.S. Pat. No. 5,389,271 which is incorporated herein by reference. Because these lower molecular weight neutralized sulfonated ethylene alpha olefins also are prepared from polymers having substantial terminal unsaturation the added functionality is substantially at the end of the polymer chain.

In general the ionomeric polymer will have from about 0.5 to about 200 milli-equivalents of pendant neutralized sulfonate groups per 100 grams of polymer and preferably from about 1.0 to 100 milli-equivalents of neutralized sulfonate groups. Preferably the sulfonate groups will be about 50% neutralized with Group IA, IIA, IB or IIB metal (see the previously cited Table of Elements), an amine or ammonia.

In the compositions of the present invention it is preferred that the alpha olefin of the lower molecular weight copolymer be the same alpha olefin as the high molecular weight copolymer.

The compositions of the present invention can be prepared by any convenient method. For example, the compositions can be prepared by mixing in a suitable blender such as a Brabender mixer.

The following examples will demonstrate improved toughness and enhanced processability of polyolefin compositions of the present invention. In all of the examples which follow the compositions were melt processed in a Brabender mixer heated at 193° C. The materials were mixed for five minutes at 100 RPM. After mixing the material was cooled to room temperature, cut into pieces and compression molded at 193° C. into tensile specimens. The specimens were compression molded into approximately 2"×2"×0.02" pads at 29 tons pressure. The appropriate size sample for the tensile testing measurements were cut from these pads.

The mechanical properties were obtained from an Instron® Tensile Tester at 25° C. with a clamp speed of 0.2 cm/min.

EXAMPLE 1

An ethylene-1-butene copolymer prepared using a single site catalyst, containing 82.3% wt. % ethylene content and having a weight average molecular weight of 7400 g/mole was used to form the neutralized sulfonated copolymer.

The sulfonation procedure is described as follows: Into a four neck, 1 liter flask equipped with a nitrogen gas feed, a thermometer, an air driven stirrer, condenser, heating mantle, 300 mls of heptane was added. Subsequently, 30 g of the ethylene-butene (EB) copolymer was dissolved. The temperature of the solution was elevated to approximately 90° C. (i.e., 89°–95° C.) in order to ensure complete solution of the semi-crystalline EB. Upon thermal equilibration, 2.3 mls of acetic anhydride was dissolved, followed by the slow addition of 0.9 mls sulfuric acid. The time period of the sulfuric acid addition was approximately 15–20 minutes. After 30 minutes of continual agitation, the functionalized EB copolymer was neutralized with 2.58 g of sodium acetate dissolved in 6 mls water and 3 mls methanol. The temperature during this procedure was permitted to cool to room temperature.

The neutralized copolymer was isolated through steam stripping. The material was recovered, air dried and then dried more thoroughly in a vacuum oven at 60° C. for about 24 hours. Dietert sulfur analysis was performed and the sulfur content is used to calculate the sulfonation level. In this particular procedure, the sulfur analysis is 0.43 wt., which corresponds to 13.5 meq/100 g polymer. The final product is a sodium neutralized (monofunctional) sulfonated EB copolymer.

EXAMPLE 2

The procedure detailed in Example 1 was repeated except the neutralization procedure entailed using zinc acetate, i.e., 5.78 g zinc acetate dissolved in 8 mls water and 3 mls of methanol.

The sulfur content was 0.58 wt. %, which corresponds to 18.2 meq/100 g polymer. The final product is a zinc neutralized (monofunctional) sulfonated EB copolymer.

EXAMPLE 3

The procedure detailed in Example 1 was repeated except the neutralization procedure entailed using calcium acetate, i.e., 4.99 g calcium acetate dissolved in 16 mls water/3 mls methanol.

Comparative Example 1

Tensile properties for unblended EB copolymers were obtained and are included in the accompanying Table.

TABLE

MECHANICAL PROPERTIES AND TORQUE REDUCTION MEASUREMENTS

| | Metal Counterion | Additive (%) | Modulus (PSI) | Torque Reduction (%) | Energy at Break (IN-LBS) | Elongation at Break (%).) | Tensile Strength (PSI) |
| --- | --- | --- | --- | --- | --- | --- | --- |
| Comparative | None | 0.0 | 301.0 | 0.0 | 12.7 | 1059.0 | 1905.0 |
| Ex 4 | Sodium | 1.0 | 667.0 | 10.0 | 13.6 | 1055.0 | 1736.0 |
| Ex 5 | Sodium | 3.0 | 708.0 | 30.0 | 12.7 | 1013.0 | 1723.0 |
| Ex 6 | Sodium | 5.0 | 695.0 | 27.0 | 11.9 | 1037.0 | 1802.0 |
| Comparative | None | 0.0 | 301.0 | 0.0 | 12.7 | 1059.0 | 1905.0 |
| Ex 7 | Zinc | 1.0 | 738.0 | 10.0 | 13.0 | 1043.0 | 1711.0 |
| Ex 8 | Zinc | 3.0 | 1028.0 | 22.0 | 10.3 | 966.0 | 1520.0 |
| Ex 9 | Zinc | 5.0 | 1041.0 | 18.0 | 12.2 | 995.0 | 1602.0 |
| Comparative | None | 0.0 | 301.0 | 0.0 | 12.7 | 1059.0 | 1905.0 |
| Ex 10 | Calcium | 1.0 | 610.0 | 15.0 | 12.8 | 1041.0 | 1695.0 |
| Ex 11 | Calcium | 5.0 | 864.0 | 22.0 | 11.2 | 970.0 | 1693.0 |
| Comparative | None | 0.0 | 301.0 | 0.0 | 12.7 | 1059.0 | 1905.0 |
| Ex 12 | None | 1.0 | 743.0 | 28.0 | 16.0 | 1097.0 | 1739.0 |
| Ex 13 | None | 3.0 | 904.0 | 27.0 | 12.6 | 1018.0 | 1726.0 |
| Ex 14 | None | 5.0 | 1194.0 | 27.0 | 11.3 | 935.0 | 1572.0 |

The sulfur content was 0.64 wt % which corresponds to 20.0 meq/100g polymer. The final product is a calcium neutralized (monofunctional) sulfonated EB copolymer.

EXAMPLE 4–11

The above sulfonated EB semicrystalline, monofunctional ionomers were melt blended in varying amounts with an ethylene-butene copolymer made with a single site catalyst and having a melt index of 4.5 and a density of 0.873 g/cc.

Tensile properties of the various blends and the reduction in torque were obtained and are listed in the Table which follows.

EXAMPLES 12–14

Blends were made using the unfunctionalized lower copolymer molecular weight EB copolymer (7400 g/mole) and an EB copolymer having a melt index of 4.5 and a density of 0.8739/cc. The tensile properties and observed torque reduction for these blends also is given in the accompanying Table.

What is claimed is:

1. A composition comprising:
   (a) a major amount of a first ethylene alpha olefin copolymer prepared using a single site catalyst of a cyclopentadienyl derivative of a Group IVB metal and having a weight average molecular weight greater than about 30,000; and, (b) a minor amount of a sulfonated derivative of an ethylene alpha olefin copolymer prepared using a single site catalyst of a cyclopentadienyl derivative of a Group IVB metal and having a lower weight average molecular weight than the first copolymer and in the range of about 600 to about 50,000 wherein about 50% of which is metal, amine or ammonia neutralized.

2. The composition of claim 1 wherein the alpha olefin of each copolymer has from about 3 to about 12 carbon atoms.

3. The composition of claim 2 wherein the alpha olefin is the same for each copolymer.

4. The composition of claim 3 wherein the sulfonated derivative of the ethylene alpha olefin copolymer has from about 10 to about 200 milli-equivalents of sulfonate groups per 100 grams of polymer.

5. The composition of claim 4 wherein the sulfonate groups are metal neutralized.

* * * * *